(12) United States Patent
Rubin (10) Patent No.: US 8,457,795 B1
(45) Date of Patent: Jun. 4, 2013

(54) ENERGY-SAVING REFRIGERATION THROUGH SENSOR-BASED PREDICTION TO HEDGE THERMAL AND ELECTROMECHANICAL INERTIA

(75) Inventor: Stuart Rubin, San Diego, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 341 days.

(21) Appl. No.: 12/913,810

(22) Filed: Oct. 28, 2010

(51) Int. Cl.
*G05D 23/00* (2006.01)

(52) U.S. Cl.
USPC .......................................... 700/275; 700/300

(58) Field of Classification Search
USPC .............................. 700/275, 299, 300; 706/21
See application file for complete search history.

(56) References Cited

U.S. PATENT DOCUMENTS

| | | | | |
|---|---|---|---|---|
| 6,000,232 | A | * | 12/1999 | Witten-Hannah et al. ........ 62/89 |
| 6,317,700 | B1 | * | 11/2001 | Bagne ........................... 702/181 |
| 6,726,113 | B2 | | 4/2004 | Guo |
| 7,047,226 | B2 | | 5/2006 | Rubin |
| 7,539,796 | B2 | * | 5/2009 | Nowlan et al. ................... 710/72 |
| 2009/0216968 | A1 | * | 8/2009 | Martin et al. .................. 711/161 |

OTHER PUBLICATIONS

S.H. Rubin, Computing with words, IEEE Trans. Syst. Man Cybern. 29 (1999) 518-524.
L.A. Zadeh, From computing with numbers to computing with words—from manipulation of measurements to manipulation of perceptions, IEEE Trans. Ckt. Syst. 45 (1999) 105-119.
W. Pedrycz and S.H. Rubin, Numeric data to information granules and computing with words, in Proc. IEEE Int. Conf. Syst., Man and Cybern., San Antonio, TX, 2009.
Q. Liang and S.H. Rubin, "Randomization for Testing Systems of Systems," Proc. 10th IEEE Intern. Conf. Info. Reuse & Integration, Las Vegas, NV, Aug. 10-12, 2009, pp. 110-114.
S.H. Rubin, On randomization and discovery, Information Sciences, (INS-D-05-1154), vol. 177, issue 1, Jan. 2007, pp. 170-191.
J-H. Lin and J.S. Vitter, "Complexity Results on Learning by Neural Nets," Mach. Learn., vol. 6, No. 3, pp. 211-230, 1991.
C. Aprea, R. Mastrullo and C. Renno, Fuzzy Control of the Compressor Speed in a Refrigeration Plant, International Journal of Refrigeration (2004), vol. 27, pp. 639-648.
M. Becker, D. Oestreich, H. Hasse, L. Litz, Fuzzy Control for Temperature and Humidity in Refrigeration Systems (1994), Proceedings of the Third IEEE Conference on Control Applications, pp. 1607-1612.
Non-published patent application entitled Method for Summarizing Natural Language Text, U.S. Appl. No. 12/268,018, filed Nov. 10, 2008, inventor: Rubin, Stuart.

* cited by examiner

*Primary Examiner* — Ryan Jarrett
(74) *Attorney, Agent, or Firm* — Kyle Eppele; Stephen E. Baldwin (57) ABSTRACT

In one embodiment, the present invention is a retrofit to rapidly transition to existing consumer refrigerator-freezer product lines in order to greatly eliminate wasted energy. This occurs because spurious opening of the system doors allows heat to enter with the deleterious side effect of causing the compressor to cycle on and off. This, in turn, consumes more power than if such duty cycles could be predicted, which would allow for their smoothing. The invention takes advantage of existing sensor technologies and develops a computational framework for their fusion for the prediction of a dependency, which controls operation of the compressor. Instances of a predictive schema are evolved and this approach allows for greater accuracy in less time than would be possible using competing neural network or support vector machine technologies. A novel evolutionary algorithm is included, which is so defined as to allow its execution on a lower-end computer.

18 Claims, 5 Drawing Sheets

```
((DEFUN MYSORT (S)
  (COND ((NULL S) NIL)
    (T (CONS (MYMIN S (CAR S)) (MYSORT (REMOVE (MYMIN S (CAR S)) S))))))
? io
(((((1 3 2)) (1 2 3)) (((3 2 1)) (1 2 3)) (((1 2 3)) (1 2 3)))
? (pprint (setq frepos '((CRISPY'
      (DEFUN MYSORT (S)
        (COND
         (FUZZY
          ((NULL S) NIL)
          ((ATOM (FUZZY S ((FUZZY CAR CDR) S))) NIL))
         (T (CONS (MYMIN S (CAR S))
          (MYSORT (REMOVE (MYMIN S (CAR S)) S))))))))))

((CRISPY '(DEFUN MYSORT (S)
  (COND (FUZZY ((NULL S) NIL) ((ATOM (FUZZY S ((FUZZY CAR CDR) S))) NIL))
    (T (CONS (MYMIN S (CAR S)) (MYSORT (REMOVE (MYMIN S (CAR S)) S))))))))

; Note that (ATOM S) was automatically programmed using the large fuzzy function space.

? (pprint (auto frepos io))

((DEFUN MYSORT (S)
  (COND ((ATOM S) NIL)
    (T (CONS (MYMIN S (CAR S)) (MYSORT (REMOVE (MYMIN S (CAR S)) S))))))

; Note that each run may create syntactically different, but semantically equivalent functions:

? (pprint (auto frepos io))

((DEFUN MYSORT (S)
  (COND ((NULL S) NIL)
    (T (CONS (MYMIN S (CAR S)) (MYSORT (REMOVE (MYMIN S (CAR S)) S))))))
```

ENERGY-SAVING REFRIGERATION THROUGH SENSOR-BASED PREDICTION TO HEDGE THERMAL AND ELECTROMECHANICAL INERTIA

FEDERALLY-SPONSORED RESEARCH AND DEVELOPMENT

This invention (Navy Case No. 100,520) is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-2778; email T2@spawar.navy.mil.

CROSS-REFERENCE TO RELATED PATENT APPLICATIONS

This application is related to application Ser. No. 12/268, 018, filed Nov. 10, 2008 by Stuart Rubin (NC 098324), entitled "Method for Summarizing Natural Language Text", which is assigned to the same assignee as the present application, and the details of which are hereby incorporated by reference.

BACKGROUND

Some prior refrigeration systems entail the use of neural networks to control the duty cycle of the compressor on a consumer refrigerator-freezer unit. Neural networks and closely related support vector machines attempt to predict when and for how long the unit doors will be opened on the basis of past use. However, these older methods are associated with the following disadvantages at a minimum. First, the accuracy of such predictions is curtailed by the limited use of sensory data. Second, a symbolic model is not evolved, which third renders learning by these older methods NP-hard. Thus, they take an inordinate amount of time to adapt to changes in usage patterns and this is associated with the need for higher-end computer chips, which of course draw more electrical power—negating that which they are trying to save.

SUMMARY

In one embodiment, the present invention is a retrofit to rapidly transition to existing consumer refrigerator-freezer product lines in order to greatly eliminate wasted energy. This occurs because spurious opening of the system doors allows heat to enter with the deleterious side effect of causing the compressor to cycle on and off. This, in turn, consumes more power than if such duty cycles could be predicted, which would allow for their smoothing. The invention takes advantage of existing sensor technologies and develops a computational framework for their fusion for the prediction of a dependency, which controls operation of the compressor. Instances of a predictive schema are evolved and this approach allows for greater accuracy in less time than would be possible using competing neural network or support vector machine technologies. A novel evolutionary algorithm is included, which is so defined as to allow its execution on a lower-end computer.

BRIEF DESCRIPTION OF THE DRAWINGS

Reference is now made to the drawings, where like components are represented by like reference numerals.

DETAILED DESCRIPTION OF THE EMBODIMENTS

In one embodiment, the present invention was conceived as a retrofit to rapidly transition to existing consumer refrigerator-freezer product lines in order to greatly eliminate wasted energy. This occurs because spurious opening of the system doors allows heat to enter with the deleterious side effect of causing the compressor to cycle on and off. This, in turn, consumes more power than if such duty cycles could be predicted, which would allow for their smoothing. The invention takes advantage of existing sensor technologies and develops a computational framework for their fusion for the prediction of a dependency, which controls operation of the compressor. Instances of a predictive schema are evolved and this approach allows for greater accuracy in less time than would be possible using competing neural network or support vector machine technologies. A novel evolutionary algorithm is included, which is so defined as to allow its execution on a lower-end computer. Certain mathematical techniques are employed to speedup the algorithm roughly one thousand times with little sacrifice in qualitative accuracy. Also, the technique can be extended to all manner of military systems, among others, where predictive accuracy is needed along with a capability to learn to improve its performance.

Figure 1:
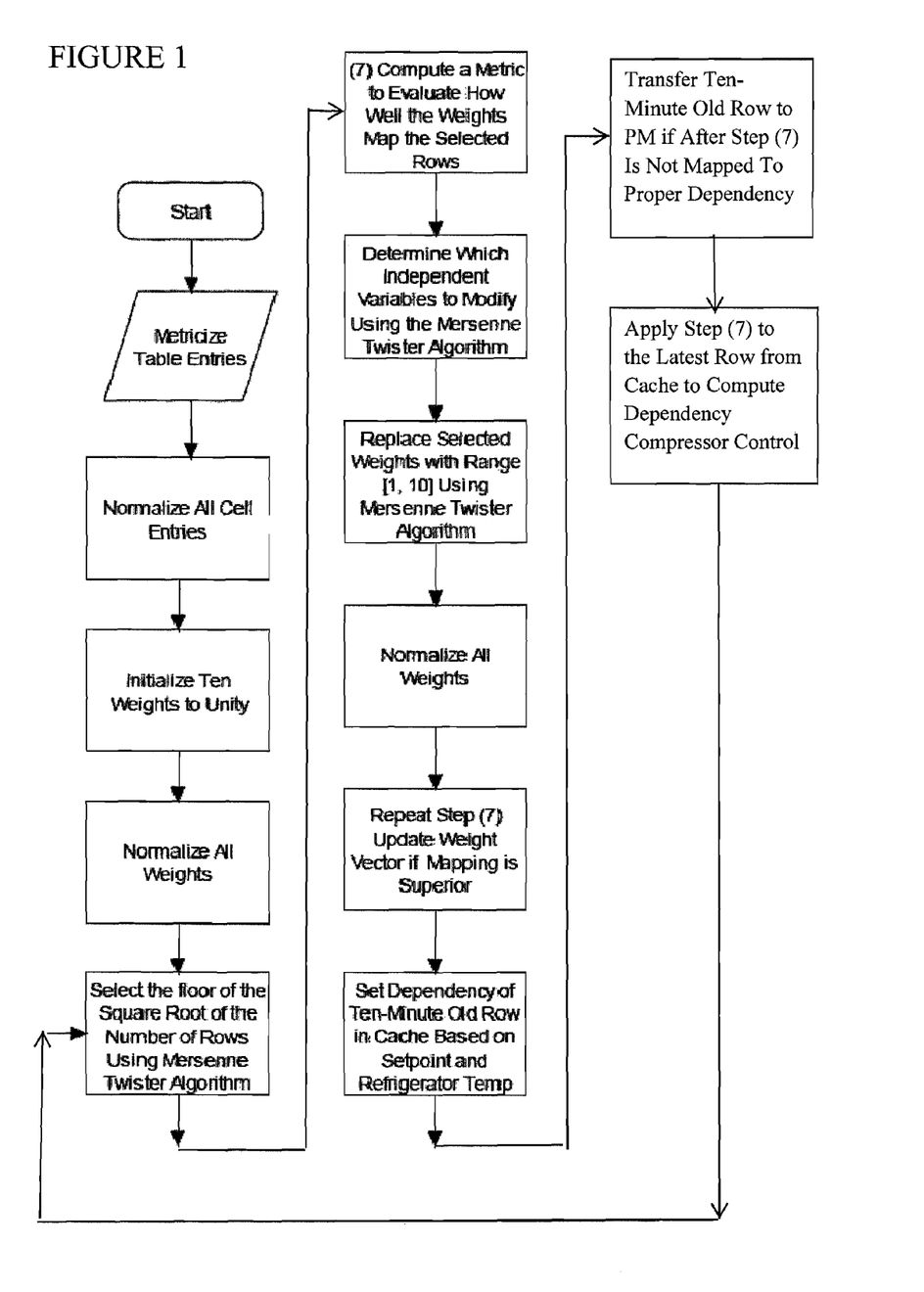
FIG. 1 shows a block diagram for a predictive refrigeration flow chart of the present invention.

FIG. 1 shows a block diagram of a flow chart for a predictive refrigeration embodiment of the present invention, which will be described in more detail taken in conjunction with FIG. 6 and Tables 1 and 2.

Several years back, GE announced a $35 million prize for anyone who could invent a more energy-efficient home refrigerator. This prize was ultimately won by a design that incorporated a neural network to regulate the compressor so that it would not cycle on and off so much in response to the refrigerator door being frequently opened and closed. This system controls compressor frequency, fan speed, and control system gain in response to setpoint and actual current temperatures. This disclosure leaves the programming of that neural network to those skilled in the art.

First, we describe the problem to be addressed; second, the operational parameters of that problem; and finally, our unique solution offered in resolution of that problem. The problem is to invent a more energy efficient refrigerator. There have been numerous attempts in this regard, which include thermoelectric (Peltier effect), acoustic, magnetic, ammonia absorption, and several even less well-known techniques (e.g., ammonium nitrate dissolved in water absorbs some heat). All of these methods have a place and use. For example, thermoelectric refrigerators are solid state and are appropriate where the highest reliability, small size, as well as noiseless operation are of paramount concern, but energy efficiency is not. Magnetic refrigerators are best-suited to getting within a fraction of a degree of absolute zero. However, the problem addressed herein pertains to how to increase the refrigeration capability of standard household refrigerator-freezers while minimizing the energy draw. In other words, this disclosure pertains primarily to increasing the energy efficiency of Carnot cycle refrigerators with spillover towards countering the thermal inertia associated with thermoelectric refrigeration units as well.

Refrigerators used to consume more energy than any other home appliance, but in the last twenty years refrigerators have been made more energy efficient. Current models that are Energy Star qualified use 50 percent less energy than models made before 1993. Energy Star qualified refrigerators use much less energy than older models as a direct result of improvements in insulation and compressors. The most energy-efficient unit made in the US runs on 120 or 110 volts, and consumes about half a kilowatt-hour per day. Larger units, especially those with large freezers and icemakers, will use as much as 4 kWh per day.

Given the different styles of refrigerators, top-freezer models are more efficient than bottom-freezer models of the same capacity, which are in turn more efficient than side-freezer models. Models with through-the-door ice units are less efficient than those lacking this feature.

Next, consider the remaining sources of said energy inefficiency, which are as follows. First and principally, it is known that starting and stopping a refrigeration motor must counter electrical and mechanical inertia, which is produced. Thus, we want to minimize the number of times the compressor is started and stopped. Then too, there is thermal inertia. This means that by the time the setpoint is attained and the compressor (or thermopile) is started there will be a lag before the interior cools below the setpoint. During this time, the contents of the interior will continue to warm; albeit, at a decreasing rate until it cools again.

Figure 2:
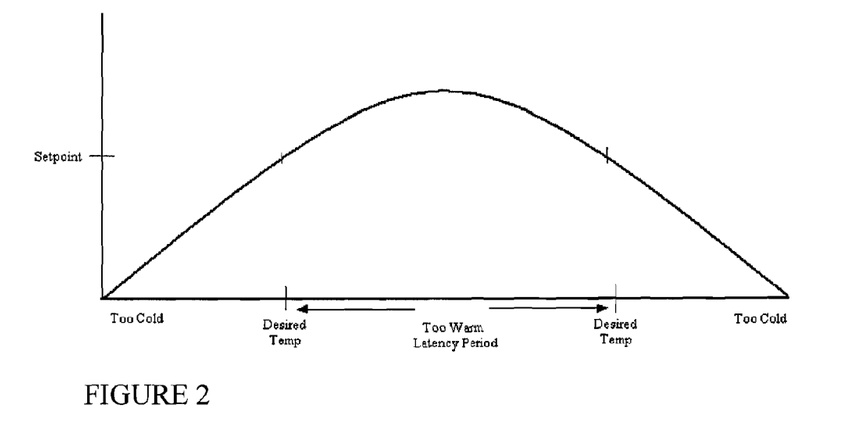
FIG. 2 shows a diagram of latency and thermal inertia.

FIG. 2 shows a diagram of latency and thermal inertia which depicts this situation graphically. Note that the latency period will be a function of the type of cooling, the unit's physical architecture, temperature differentials, as well as some lesser factors.

Minimization of the latency period requires that the cooling elements have a large surface area relative to that of the unit's interior, that the cooling elements be transformed to a relatively low temperature (i.e., not too low lest freezing or burning occur) as quickly as possible, and that the ambient air in the unit's interior be moving rapidly once the setpoint or below is attained.

Figure 3:
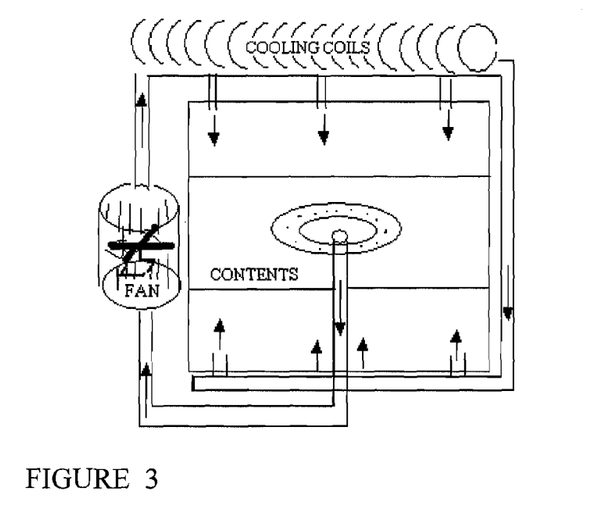
FIG. 3 shows a 2-D diagram of minimization of the latency period.

FIG. 3 shows a diagram of two-dimensional minimization of the latency period which depicts a generic solution towards minimization of the latency period. Note that refrigerators marketed for home use have a tendency to become packed and this limits airflow. However, by creating a relative vacuum in the center of the refrigerator or freezer, colder air can be forced in from all surrounding sides and then recycled through the center of the device.

Another hedge to counter thermal inertia (not shown) is to refrigerate a mixture of water and ethanol (to lower the freezing point and viscosity to allow for pumping) and store this mixture in a Dewar flask to transfer heat from the interior of the unit to the mixture as necessary using a simple architectural design. This has the advantage of minimizing the number of times that the compressor needs to be cycled, but is not considered herein because to do so would require modification of existing refrigerator designs—reducing the ease of transition.

Thermoelectric refrigeration units have a low capacity to pump heat in relation to Carnot cycle units. They also, as a generalization, are used to refrigerate—not freeze. This disclosure does not go on to further address them other than to note how to minimize their latency period.

We now move on to address the principle object of this disclosure—how to save energy while maintaining refrigeration by minimizing the number of cycles of the electromechanical "Freon" pump. Modern home refrigerators are underpinned by the technology such as presented in the block diagram of an essential home refrigerator shown in FIG. 4, which shows "A" (inside the refrigerator), "B" (compressor) and "C" (expansion valve).

Figure 4:
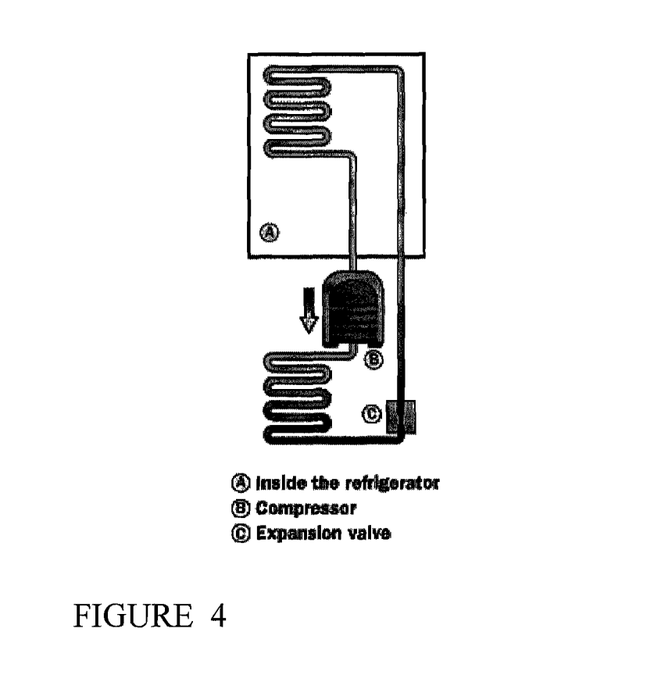
FIG. 4 shows a block diagram of a home refrigerator.

In particular, the electromechanical pump is switched on and off by an interior thermostat. Not only are there electrical inefficiencies, which arise from compressor inductance, but there are attendant thermodynamic inefficiencies as well. In particular, the compressor needs to be switched on for a period that is sufficiently long to allow pressure to build up in the "hot" line, to allow heat to radiate from it, to allow it to liquefy in the condenser, and to evaporate from there, and to allow heat to thus be absorbed from the interior of the refrigerator.

This process takes a minimum of a minute to start or ten minutes to be efficient. Ideally, the system will switch on the compressor about five to ten minutes before the user opens the refrigerator door. In this manner, the foods average temperature remains constant and its variance in temperature (due to latency) is minimized.

This brings us to our central thesis; namely, how does one predict refrigerator/freezer usage to minimize the variance in temperature of its contents? The answer stems from the well-known operating system principle of temporal locality, or the tendency that if a computer program runs one or a sequence of instructions during one time period, then that instruction or sequence of instructions is more likely to be referenced in the immediate future (see, for example, H. M. Deitel, An Introduction to Operating Systems, Prentice Hall: Upper Saddle River, N.J. 1984).

But, just what variables should be sensed in order to be most predictive? Clearly, the time of day better correlates with the opening of the refrigerator door than does say the barometric pressure. Moreover, the door may be opened by a variable number of adults and children alike. Indeed, the number and dynamics of the associated variables implies that this problem is necessarily one which involves machine learning, or in other words, an adaptive response.

The system handles two or more people opening the door in rapid succession—not by noting the number of people, but rather by operating strictly off of their signature effects (e.g., raising the interior temperature of the unit). Such an inherent chaining approach serves to simplify the handling of what might otherwise be perceived to be complex scenarios.

The following listing is a partial list of variables/features, which are deemed to have a high correlation with predicting when a person may open a refrigerator or freezer door—particularly so in combination with each other.

1. Refrigerator temperature
2. Setpoint
3. Inside temperature
4. Outside temperature
5. Time of day
6. Day of week—holiday or workday
7. Time from last opening refrigerator/freezer door
8. Relative humidity (relates to thirst)
9. Motion detector for person(s) in house
10. Motion detector for person(s) in kitchen Again, the energy-saving principle is that if the computer can know exactly when the refrigerator/freezer door will be opened, for how long, and the ambient temperature; then, it can reduce the interior temperature a priori to compensate—thereby keeping the food cold and saving energy on the need for frequent restarts of the compressor. Even if incorrect, the heat of fusion for water is quite high, which implies that there will be little chance for frost damage in the refrigerator—particularly if the setpoint is above 32° F.

As computational and sensor technologies become evermore sophisticated, they tend to create a glut of data. A plethora of data can be useful in some record-keeping applications (e.g., aircraft black boxes), but for the majority of applications one needs to convert volumes of passive data into actionable knowledge (e.g., intelligence). Such knowledge has found applications in targeting, logistics, adversarial COA, MDA, satellite imagery, and in all truly autonomous systems.

The reduction of data to knowledge is time critical because the capability for primary memory (PM) storage is currently doubling every 18 months in accordance with Moore's Law. This means that the complexity of information is quadrupling during the same period. The reduction of data to knowledge with or without loss is referred to as randomization, such as described in the above cross-referenced NC 098324 patent application. The best way to randomize data for serious applications is to apply knowledge to the randomization process itself. This is termed directed mining by the data mining community and model-based reasoning by others.

Just as towed-sensor arrays employ Markov Chains to enhance the predictive capability of sensed data, Computing with Words as known in the literature can provide a context for extracting meaning from numerical and non-numerical entities alike. For example, there is no purely mathematical technique that can predict that a ship's course will not ground the ship on an intervening island. Using Computing with Words, such knowledge can be represented in a way that would not otherwise be possible. Many pieces of knowledge need to be integrated for the optimization of complex predictions (e.g., when a refrigerator door will be opened). This requires sophistication in representation, which we humans accomplish using the expressive power of natural language. For example, consider an enemy bombing run and the observation that, "the targets appear to be getting more and more random". Here, Computing with Words is needed to provide the representation for that observation. An enormous capability for randomization is thus provided—addressing the focal need. Whereas numerical analysis uses probabilities to rank likelihoods of an event—Computing with Words uses possibilities to measure certainties, which while similar to probabilities, are fuzzy by nature. Possibilities need not be abstract and are useful in the direction of control mechanisms.

Suppose that one were to synthesize a sort function. This has actually been performed by us and is sampled in FIG. 5, which shows a diagram of component synthesis by way of testing. Rather than concern ourselves with such details as, "should I use For i=1 to n−1, or is it n, or is it n+1" and the like, we set up a transformational space of alternative function configurations and enable the computer to uniformly cover the search space subject to such I/O constraints as (((3 2 1) (1 2 3)) ((3 1 2) (1 2 3))). That is, when (3 2 1) is input to the sort function, the sort function is required to output (1 2 3). Similarly, when (3 1 2) is input to the sort function, the sort function is required to output the same (1 2 3). Such randomization (compression) has an attendant advantage in that it allows for more thorough testing of software components by virtue of their falling on a greater number of execution paths. Moreover, here testing provides the functional definition.

Figure 5:
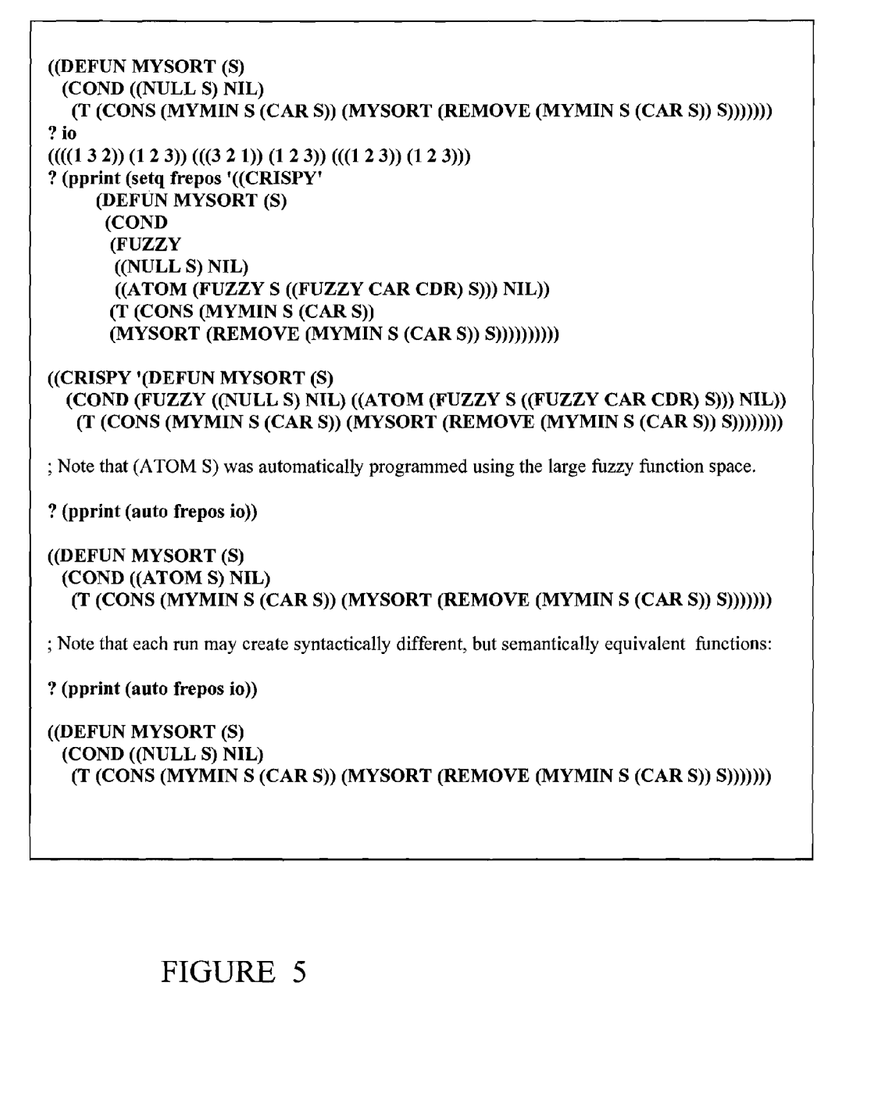
FIG. 5 shows a component synthesis of a sort function.

It is certainly easier to specify say, For i=1 to [n−1, n+1] than to be exact (see FIG. 5). Besides, the validity of the complex software, under any design methodology, is only as good as the testing that it undergoes. It is just that using random-basis testing, while the need for functional decomposition remains, the complexity for the designer is shifted from writing code to writing relatively random tests. The complexity of the former grows non-linearly with scale; whereas, the complexity of the latter is essentially linear with scale. Furthermore, the test vectors can be dynamically configured by the context of the problem—leading to the automatic synthesis of control rules. Testing may be applied to everything—including the synthesis of components for controlling the operation of a commercial refrigerator.

At the bottom of FIG. 5 we see semantically equivalent, but syntactically distinct definitions for MYSORT. Both functions have the same specified I/O behavior and both are instances of the same "fuzzy" program-writing component.

FIG. 5 shows how part of the work in functional programming can be off-loaded to the machine. That is, cognition is something the human does best and the machine does not do, while search is something the machine excels at and the human is relatively poor at.

Thus, we start with a simple sort function, which we want to program. No matter what technique we use to program it, it will need to be tested using an I/O characterization. Here, we move the testing phase up and use it to facilitate the automated partial synthesis of the sort program.

A key concept in writing the program is that instead of the user searching for the correct code construct or function at various points in the program, the user specifies a space of alternative constructs at a limited number of articulation points. The less powerful the computer, the more limited this number need be and vice versa. In fact, the user is encouraged to break up the association of articulation points using the triangle inequality. This means that it is better to have several program schemata with few articulation points than to place all of the articulation points in one schema, where the combinatorial complexity can easily overwhelm at least a low-end computer.

In any case, the user specifies reasonable alternatives, which are captured in the form of a set. For example, instead of writing the familiar, "For i=1, n", the user might write, "For i=1, {n−1, n, n+1}". Here, the user need not contemplate the details—details that would detract from his/her capability to be an efficient programmer. The computer will find programs that satisfy the test vectors, if possible. These tests should be written using a relatively minimal number of test cases giving maximal execution coverage—in other words, a random collective in the sense used by, for example, the Kolmogorov-Chaitin complexity.

It is possible to extend the concepts presented in FIG. 5 to non-functional programming (e.g., the design of a GUI). However, here results would need to be evaluated by an expert system or equivalent to mimic the feedback provided by simple test cases employed in functional programming. Again, these concepts have been programmed in common LISP and confirmed, where FIG. 5 presents a snippet of functional programming results.

Given a test suite, it is possible to automatically synthesize a more or less optimal component-based functional program that is in satisfaction of this suite (e.g., see FIG. 5 for an example using the LISP programming language). There are some details requiring attention, such as knowing when a particular sequence will lead to a stack overflow, but these are easily resolved using an allowed execution time parameter and impressive programs have been so synthesized—supporting the component-based concept. Notice that components can be written at any scale given parallel processing support—from primitive statements to complex functions. Given only so much allocated search time, the system will either discover a solution or report back with failure. This is in keeping with the recursive unsolvability of the Halting Problem, such as described, for example, in V. A. Uspenskii, Gödel's Incompleteness Theorem, Translated from Russian, Moscow: Ves Mir Publishers, 1987, S. H. Rubin, On randomization and discovery, Information Sciences, (INS-D-05-1154), vol. 177, issue 1, January 2007, pp. 170-191, and A. J. Kfoury, R. N. Moll, and M. A. Arbib, A Programming Approach to Computability, New York: N.Y.: Springer-Verlag Inc., 1982.

Neural networks should not be used to control temperatures, where many factors need to be considered and most of these factors exist along a continuum]. Indeed, this relates to a shortcoming of neural network technologies in general. That is, they cannot be expected to perform well on data that is even slightly outside of their training set (unlike humans). That and the fact that their training time is NP-hard makes their performance unsuited to predicting the proper duty cycle for a refrigerator compressor. Rather, our evolutionary approach achieves this through the implementation of a heuristic search and acquisition methodology, which is exemplified in Table 1 below. Neural networks cannot do the same because they cannot effect modus ponens, or the capability if given, a→b, and a, then conclude b.

Consider the following schema shown in Table 1 for the aforementioned ten variables/features. In actuality, each row is sampled each minute to create a cache of ten or so rows. These rows are saved in main memory just in case they are distinct as revealed by a linear search. A first in first out (FIFO) policy is used to maintain the data structure in accordance with the size of primary memory. While a million rows or more can be held in primary memory that much data would be slow to be attained, would not appreciably improve accuracy (energy savings), and would result in a less complete search of the weight space. Thus, it is estimated that about one thousand rows will suffice, where about half of them will have a dependency of zero and half a dependency of one, though this distribution is not enforced. This selection will also allow for the use of relatively slower, lower wattage (e.g., 10 W), and less expensive chips (e.g., $10 US).

the independent variables. The Cycle dependency is set just in case the compressor is to be cycled on. It then cycles off once the setpoint is attained and the next fired dependency is a zero (i.e., so as to allow for smooth continuous operation of the compressor).

The first row states that the refrigerator is 40° F., its thermostat is set to 38° F., the kitchen is 72° F. and it is 80° F. outside in the shade. It is 3:00 pm, Tuesday. The refrigerator was last opened at 8:00 am. There is a 50% humidity. Someone has entered or exited the house in the last minute. No one has entered or exited the kitchen in the last minute. Given all this information, it is appropriate to immediately turn on the compressor in anticipation that the refrigerator door will likely, but not necessarily be opened soon. The remaining three rows follow suit. Dynamic adaptation and learning (see below) continues through this process.

An important question is how to train the system so that the duty cycle is set to the proper dependency on the basis of the independent variables supplied. The answer is to feedback the refrigerator temperature over successive time frames of, for example, each minute in the immediate future (i.e., for ten minutes or so). The sooner the temperature crosses the setpoint, the sooner it needs to cycle on. Here, if the interior temperature of the refrigerator currently exceeds the setpoint, then the ten minute old row in cache will have its dependency set to one. Otherwise, it will have its dependency reset to zero.

The challenging part is not so much setting the setpoint, but rather generalizing it. After all, it could be a relatively rare event for an exact match to be had among all of the independent variables. If each independent column can be assigned a weight, then the sum of the products of those weights times the differential between the observed and recorded value will yield a metric. The row yielding the minimum metric (break ties in favor of the more recent acquisition) then defines the computed dependency.

Table 2, taken in conjunction with the flow chart shown in FIG. 1, presents an evolutionary algorithm for optimizing compressor control cycles by modifying the weights. Initially, all weights are set to unity. The concept is to modify the weights so that an arbitrary row in primary memory (PM) will be mapped to some row other than itself having the same dependency with minimal error. This maximizes the chances that the compressor will be properly cycled for state spaces

TABLE 1

| The Refrigeration Schema | | | | | | | | | | | |
|---|---|---|---|---|---|---|---|---|---|---|---|
| ° F. 32-59 | Set 32-59 | Inside 32-120 | Out −60-120 | Time 0-23:59 | Day/H M-FSaSuH | Last 0-1440 | % H 0-100 | MotH 0/1 | MotK 0/1 | → | Cycle 0/1 |
| 40 | 38 | 72 | 80 | 15:00 | T | 420 | 50 | 1 | 0 | | 1 |
| 45 | 35 | 90 | 110 | 14:00 | H | 1 | 95 | 0 | 1 | | 1 |
| 33 | 35 | 62 | 72 | 09:00 | R | 540 | 30 | 0 | 0 | | 0 |
| 35 | 35 | 65 | 53 | 06:00 | F | 480 | 10 | 0 | 0 | | 0 |

Here, ° F. pertains to the refrigerator temperature, Set refers to the associated setpoint, Inside refers to the inside temperature ° F., Out refers to the outside temperature ° F., Time refers to the time of day, Day/H refers to the day of the week, where H is the holiday designation, Last refers to the elapsed time in minutes since the refrigerator/freezer door was last opened, % H refers to the relative humidity, MotH is set just in case the first motion detector has detected a person in the house in the last minute, and MotK is set just in case the second motion detector has detected a person in the kitchen (or the room where the refrigerator is located) in the last minute. These are yet to be seen. Every minute, a new row along with its associated dependency is acquired in cache. The ten minute old row is transferred to the head of primary memory, under a FIFO methodology, just in case, using the existing weights this set of independents is not mapped to the proper dependency. All variables save the Time, Day/H, MotH, and MotK are metrically evaluated along a continuum. Time is computed using a minute differential, Day/H is computed using a set differential (i.e., T is closer to W than to F and H is closest to Sa and Su), and MotH and MotK are simply distinct in their values of zero/one.

TABLE 2

(Also see FIG. 1)

1. Metricize table entries to enable a differential as previously described.
2. Normalize all cell entries, if any are needed for cold starting.
   This serves to prevent, for the same weight, one variable from having an unduly greater numeric sum than another on average.
3. Initialize the ten weights to unity.
4. Normalize all weights.
5. Do
6. Select the floor (SQRT (number of rows)) at uniform chance using the Mersenne Twister algorithm. Repeat the call if a row would otherwise be selected twice to select r rows. Using the SQRT of the number of rows is not as good as using all of the rows, but is almost as good and 1,000x faster (i.e., $33^2$ vs. $1,000^2$). It can be shown that the SQRT function is optimal in space-time by setting the first derivative to zero and then finding a minimum function (as has been done to compute the optimum number of levels of indirection and rows per level in databases).
7. For each selected row i, compute $\sum_{j=1}^{10} wt_j \Delta cell_{i,j}$,
   where i is not the current selected cell. That is, compute the weighted sum of how it differs from the cell entry-excepting itself Find the row having the minimal such sum, resolving ties in favor of the most recent acquisition. If this row has the same (i.e., correct) dependency as the selected row, add zero, else add one to a running counter initialized to zero. This running counter forms a global sum, GS, including each of r selected rows.
8. Generate a uniform random coin toss for each independent variable using the Mersenne Twister algorithm, since it has the best period and is relatively fast. This determines which independent variables will be modified in an attempt to improve the weighting.
9. For each independent variable so selected, replace its weight with one in the range [1, 10]. The exact value for replacement is determined by a call to the uniform Mersenne Twister algorithm.
10. Normalize all weights.
11. Repeat Step (7) to compute a new GS after saving the preceding weight vector. If new GS < old GS, then replace the old weight vector with the new one.
12. Every minute a new row along with its associated dependency is acquired in cache. If the interior temperature of the refrigerator currently exceeds the setpoint, then the ten minute old row in cache will have its dependency set to one. Otherwise, it will have its dependency reset to zero.
13. The ten minute old row is transferred to the head of primary memory after normalizing all ten of its cell entries, under a FIFO methodology to make room for it, just in case, using the existing weights and Step (7) this set of independents is not mapped to the proper dependency.
14. Take the latest row from cache, normalize all ten of its cell entries, and apply the existing weights and Step (7) to compute a dependency. This dependency will turn on (1) or off (0) the compressor. This is just the actuation step. No learning occurs here.
15. Forever.

A flashing red light and a pleasant buzzer can cycle on just in case the door is held open for too long or left ajar (e.g., due to overstocking) The cycle time is set to about 10-15 seconds as desired.

One embodiment of the present invention is for the purpose of further reducing energy consumption by consumer refrigerator-freezer units that currently retail for $1,000 or more. This embodiment would seek an immediate transition to one or more of the major consumer manufacturers (e.g., Westinghouse, GE, Samsung, et al.).

Figure 6:
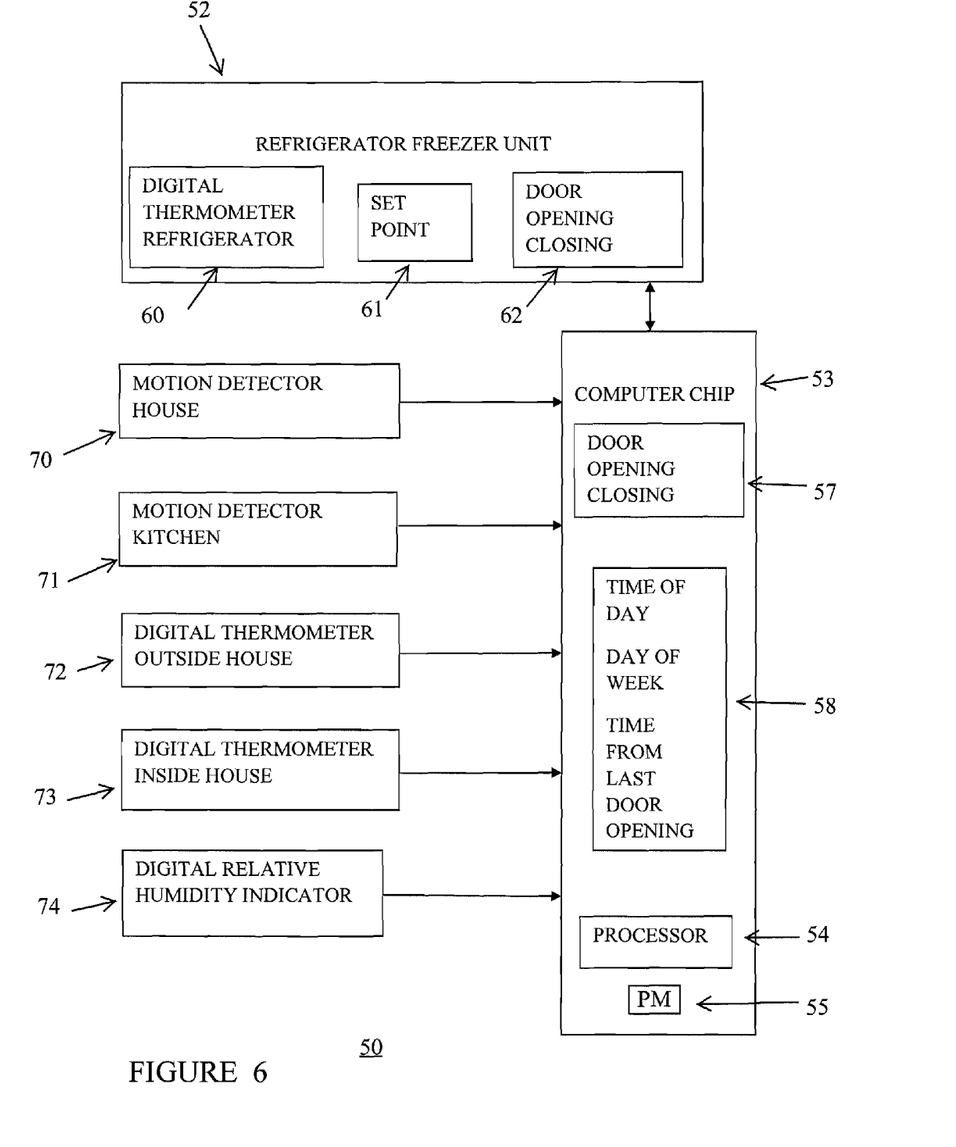
FIG. 6 shows a block diagram of a refrigeration system of one embodiment of the present invention.

FIG. 6 shows a system embodiment of the present invention which includes a consumer refrigerator-freezer unit, two motion detectors (for house and kitchen), three digital thermometers (refrigerator, inside house, outside house), a digital relative humidity indicator, and a low-powered computer chip. The computer chip embodies a processor (and associated primary memory (PM)), together with the sensor functions described above. As shown in FIGS. 1 and 6, taken in conjunction with Tables 1 and 2, the present invention learns to predict when the refrigerator-freezer doors are likely to be opened on the basis of sensor data and adjusts the duty cycle of the compressor accordingly to save on electrical requirements.

The refrigerator/freezer system 50 shown in FIG. 6 includes a refrigerator/freezer unit 52, which embodies the Digital Thermometer 60, Set Point 61 and Door Opening/Closing 62 sensor functions described above. The system 50 further includes a computer chip 53 which embodies a processor 54 and primary memory (PM) 55. The chip 53 further includes the Door Opening/Closing 57, Time of Day/Day of Week/Time From Last Door Opening 58 sensor functions, as also described above.

The system 50 shown in FIG. 6 further includes the Motion Detector House 70, Motion Detector Kitchen 71, Digital Thermometer Outside House 72, Digital Thermometer Inside House 73 and Digital Relative Humidity Indicator 74 sensor functions, as also described above.

Advantages of this invention are enumerated below. New features include, but are not necessarily limited to:

a. Incorporates past use, refrigerator temperature, inside temperature, outside temperature, setpoint, time of day, day of week/holiday/workday, relative humidity, person entering or leaving house and the same for the kitchen to make more accurate predictions than competing units
 b. Sensory data may be greatly expanded (where parallel processing may be used) or contracted as dictated by the application
 c. Evolves a symbolic model for faster and more accurate prediction
 d. Employs a mathematical speedup technique for rapid adaptation
 e. The speedup allows for the use of lower-cost, slower chips, which draw less power
 f. Can predict multiple dependencies if necessary
 g. Allows for the evolution of features for more accurate predictions
 h. Only saves a row of independent variables and associated dependency to correct an error thus minimizing the need for an otherwise larger data store and further benefitting from the ensuing additional speedup
 i. Implements a FIFO data swapping policy based on the principle of temporal locality
 j. Normalizes cells for balanced calculations
 k. Normalizes weight vector for balanced calculations
 l. Employs a randomly variable weight mutation scheme, which hill climbs better solutions
 m. Learns to improve performance with use
 n. Rapidly adapts to changes in usage patterns
 o. Can be transitioned to a plethora of other predictive domains—some applicable to military battle management, where saving lives substitutes for saving energy More or less sensors and data may be found to be appropriate on the basis of empirical tests. Similarly, the minute by minute sampling rate and the ten-minute transfer interval may be modified, if necessary, as a result of system testing. The details imbued in the file, Refrigeration Control.doc, represent a good faith effort to best delineate the anticipated best solution. Minor alterations may be appropriate in the context of application to different refrigerators. Major alterations may be required in the context of distinct applications (e.g., military applications as suggested elsewhere in this disclosure).

The U.S. Government may want to retrofit this technology to existing and planned refrigeration/freezer units, whether organic or not. By so doing, unnecessary energy usage will be minimized. The technology may also be adapted for use on ships and submarines to properly limit the use and cost of life support systems, where not presently needed. For example, ventilation systems can be restarted in anticipation of crew member's entrance into an area. The same holds for lighting systems. Also, a fighter jet or attack helicopter could be fitted with a version of this disclosure to automatically determine which subsystems to power on/off and when in response to different scenarios in the battle theatre as initiated by pilot actions and inactions. For example, switching to IR vision in the Apache Attack helicopter might automatically pre-enable heat-seeking sidewinder missiles because they can "see" what the pilot sees. Here, anticipatory prediction is not used to save energy, but rather to save the pilot on time and concomitantly provide freedom from unnecessary distractions so as to focus on the hard mission parameters.

This disclosure is important to future federal R&D because (1) it is superior to existing technologies (i.e., neural networks and support vector machines) in making predictions in situations for which a schema can be written, which is to say for the majority of systems. The exceptions here can be broadly characterized as those situations, which cannot be adequately described in natural language (e.g., most human faces). It is also important to future federal R&D because (2) it can, relative to competing technologies, learn to predict events at any level of complexity in terms of saving energy, and/or time, and/or minimizing threats, and/or maximizing destructive consequences, etc. For example, C2 data could be fed into a version of such a system to better predict the details (e.g., troop movement, aircraft tracks, weapons deployed, etc.) of how a battle will play out. Said capability is amplified by the fact that said disclosure is capable of learning to improve its performance in a way that far exceeds competing technologies—qualitatively (i.e., greater accuracy) as well as quantitatively (i.e., faster learning).

Some or all of the steps of the present invention may be stored on a computer readable storage medium, wherein the steps are represented by computer readable programming code. The steps of the method may also be computer-implemented using a programmable device, such as a computer-based system. The method may comprise instructions that, when loaded into a computer-based system, cause the system to execute the steps of the method. The method may be implemented using various programming languages, such as "Java", "C", or "C++".

Various storage media, such as magnetic computer disks, optical disks, and electronic memories, as well as computer readable media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

From the above description, it is apparent that various techniques may be used for implementing the concepts of the present invention without departing from its scope. The described embodiments are to be considered in all respects as illustrative and not restrictive. It should also be understood that system is not limited to the particular embodiments described herein, but is capable of many embodiments without departing from the scope of the claims.

What is claimed is:

1. A computer-implemented method for controlling a refrigerator compressor system comprising:
   heuristically searching and acquiring within predetermined time frames multiple independent variables and features each representative of different factors related to the operation of the refrigerator system;
   tabulating a refrigeration schema listing of the searched and acquired independent variables and features and associated dependency; and
   generating a predictive duty cycle for controlling the operation of the compressor based on weighted computations over the predetermined time frames corresponding to control rules acquired within the schema.

2. The method of claim 1 including training the system over successive time frames so that the predictive duty cycle is set to proper computed dependency, including the acquisition of a new dependency, on the basis of the independent variables and features supplied.

3. The method of claim 2 including dynamically computing the weights for all the variables and features.

4. The method of claim 3 including a computational method for modifying the weights so that an arbitrary row in a primary memory is mapped to another row other than itself to maximize the chances of properly cycling the compressor for subsequent time frames.

5. The method of claim 4 including dynamically computing a respective weight for each independent variable and feature, then summing the products of those weights times the differential between observed and recorded values to yield a metric where the minimum metric defines the computed dependency.

6. The method of claim 5 including updating the listing of the independent variables and features, which have a high association with predicting the cycle dependency when the listing is sampled within the predetermined time frames.

7. The method of claim 6 including randomizing the variable and feature listings embuing knowledge, which defines the automated and predictive duty cycle.

8. The method of claim 7 including using Computing with Words to make it easier for the user to express defining input using natural language.

9. The method of claim 8, where the listing of independent variables includes listings from the group of refrigerator temperature, setpoint, inside temperature, outside temperature, time of day, day of week—holiday or workday, time from last opening refrigerator/freezer door, relative humidity, or motion detectors.

10. A refrigerator compressor system comprising:
    a refrigerator/freezer unit including a compressor;
    a programmed computer chip for controlling the refrigerator compressor system, the chip comprising a computer-implemented method for:
    heuristically searching and acquiring within predetermined time frames multiple independent variables and features each representative of different factors related to the operation of the refrigerator system;
    tabulating a refrigeration schema listing of the searched and acquired independent variables and features and associated dependency; and generating a predictive duty cycle for controlling the operation of the compressor based on weighted computations over the predetermined time frames corresponding to control rules acquired within the schema.

11. The system of claim 10 including training the system over successive time frames so that the predictive duty cycle is set to the proper computed dependency, including the acquisition of a new dependency, on the basis of the independent variables and features supplied.

12. The system of claim 11 including dynamically computing the weights for all the variables and features.

13. The system of claim 12 including a computational method for modifying the weights so that an arbitrary row in a primary memory is mapped to another row other than itself to maximize the chances of properly cycling the compressor for subsequent time frames.

14. The system of claim 13 including dynamically computing a respective weight for each independent variable and feature, then summing the products of those weights times the differential between observed and recorded values to yield a metric where the minimum metric defines the computed dependency.

15. The system of claim 14 including updating the listing of the independent variables and features, which have a high association with predicting the cycle dependency when the listing is sampled within the predetermined time frames.

16. The system of claim 15 including randomizing the variable and feature listings embuing knowledge, which defines the automated and predictive duty cycle.

17. The system of claim 16 including using Computing with Words to make it easier for the user to express defining input using natural language.

18. The system of claim 17, where the listing of independent variables includes listings from the group of refrigerator temperature, setpoint, inside temperature, outside temperature, time of day, day of week—holiday or workday, time from last opening refrigerator/freezer door, relative humidity, or motion detectors for person(s) using house variables.

* * * * *